Figure 1:
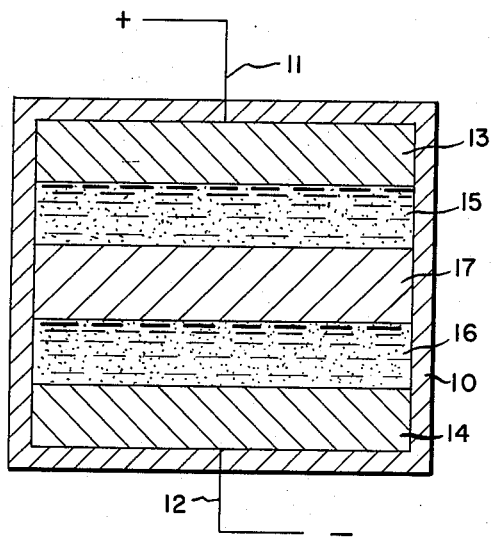

Nov. 12, 1963     W. R. WOLFE, JR     3,110,630
ELECTROLYTIC CELL
Filed Aug. 11, 1960

INVENTOR
WILLIAM R. WOLFE, JR.
BY James H. Ryan
ATTORNEY

United States Patent Office 3,110,630
Patented Nov. 12, 1963

3,110,630
ELECTROLYTIC CELL
William R. Wolfe, Jr., Wilmington, Del., assignor to E. I. du Pont de Nemours and Company, Wilmington, Del., a corporation of Delaware
Filed Aug. 11, 1960, Ser. No. 49,031
6 Claims. (Cl. 136—154)

This invention relates to new batteries of both the primary and secondary type, more particularly to such batteries based on charge-transfer compounds of organic and organo-inorganic Lewis acids and organic and organo-inorganic Lewis bases, and has as its principal object provision of the same. The charge-transfer compounds employed are also referred to as organo and/or organo-inorganic Lewis acid/Lewis base complexes or Pi complexes.

Conventional primary and secondary batteries with some minor exceptions are all based on inorganic salt electrolytes and almost uniformly use aqueous systems. The operating conditions under which these batteries can be successfully used are accordingly limited temperature-wise in the high temperature range, due to the instability of the electrolytes, and in the low temperature range, due to the necessary aqueous systems which will not function as successful battery materials below ca. —50° C. Furthermore, the conventional primary and secondary batteries are rather limited in electrical characteristics due to the relatively nonvarying electrical properties of the inorganic salt electrolytes.

There has now been discovered a new type of primary and secondary battery which is extremely versatile in both operating temperatures and electrical properties. These new batteries are based on charge-transfer compounds of organic and organo-inorganic Lewis acids with organic and organo-inorganic Lewis bases. In these batteries, both electrode reactions arise from the same entity, namely, the charge-transfer compound. These organic and organo-inorganic materials cover a wide range of operable temperatures. Furthermore, due to the extreme flexibility possible in the molecule in the electrical sense by virtue of the many varied substituents which can conveniently be placed in the structure by conventional organic reactions, the electrical properties of the batteries based thereon can be varied widely. Finally, these new batteries are based on nonaqueous systems and accordingly can function successfully in a wide range of lower temperatures based on the physical properties of the organic diluent being used.

In the primary cells of the present invention, including both dry and liquid types, there are two inert electrodes fabricated from conventional electron-collecting and -transmitting materials, coupled with allied conventional electron-transmitting circuit means, which electrodes are separated from each other by conventional inert, i.e., nonreactive, separator means, which are ionically porous. Around the negative terminal, i.e., the anode, there is an excess of the Lewis base or mixture of Lewis bases being used. Around the positive terminal, i.e., the cathode, there is an excess of the Lewis acid or mixture of Lewis acids being used. Both localized concentrations around the respective electrodes are kept from mixing by said separator means. Serving as the electrolyte in the case of the liquid cells is a saturated solution of the charge-transfer compound or compounds being used in solution in an inert organic diluent or mixture of diluents.

In the case of the dry cells which will be made up with similar electron-collecting and -transmitting means and separator means, the two inert electrodes will be in intimate contact with a paste made up of one or more of the usual inert electrical fillers, such as graphite, with an excess of the respective Lewis acids and Lewis bases, or mixtures thereof, in contact respectively with the positive and negative terminals. Again, the electrolyte will be a saturated solution of the charge-transfer compound, or mixtures thereof, being used in a suitable inert organic diluent in concentrations sufficient to make a semisolid paste with the said inert electrical fillers.

In the case of the secondary batteries, similar cell constructions will be used, varying only in that the localized excesses of the Lewis acid and Lewis base around, respectively, the cathode and the anode will not be needed. All that will be needed is the saturated solution of the organic or organo-inorganic Lewis acid/Lewis base complex or mixture of complexes being used in a suitable inert organic diluent. Conventional charging equipment well known in the art for secondary battery usage will be applied to the said cell constructions for the usual periods of time, after which the cell will serve as a source of electric energy.

All the primary and secondary cells of the present invention are of conventional design and manufacture except for the use of the organic and organo-inorganic Lewis acid/Lewis base charge-transfer compounds as the source of the anode and cathode reactions, and the use of inert organic diluents to form the electrolyte with the said charge-transfer compounds. Conventional electron-collecting and -transporting means, separators, outside cell construction, inner cell construction, inert conductors such as carbon, etc., are all useful in construction of the cells in accord with conventional techniques. Inhibitors or anticorrosive agents can also be used. In general, the more inert character of the organic and organo-inorganic Lewis acids, Lewis bases, and the charge-transfer compounds thereof will result in less problems from inhibition and corrosion, and accordingly additive materials will generally not be needed. As is conventional for the primary batteries, multiple cell construction can be used, and the cells of the liquid type can be combined in series. The dry primary cells can easily be stacked in series and/or parallel in accord with the desired electrical output characteristics, both as to voltage and amperage.

Figure 2:
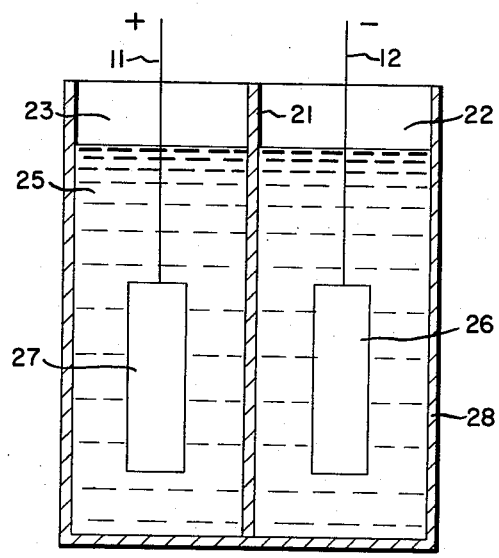

Details of the batteries of the present invention may be gathered from the drawings wherein:

FIG. 1 represents schematically a section of a dry-cell battery based on the principles of the present invention; and FIG. 2 represents schematically a wet-cell battery of the invention.

In FIG. 1 is shown a container 10 of glass or other conventional material through which penetrate conventional leads 11 and 12 connected to conventional electrodes 13 and 14 of platinum or other conductive material. Between electrodes 13 and 14 are disposed layers 15 and 16 of paste containing an organic or organo/ inorganic Lewis acid/Lewis base charge-transfer compound. The layers are separated from each other by means of a permeable separator 17 made of alumina or other porous material.

In FIG. 2 is shown a conventional container 20 separated by porous partition 21 into two cells or compartments 22 and 23 containing an organic solvent 25. Solvent 25 holds in solution a charge-transfer compound in accordance with the invention. A potential is set up between electrodes 26 and 27 by insuring a difference in concentration or other solution parameter in the solvent in the two cells as will be obvious (see Example 1, infra). The charge-transfer compounds are in many instances known in the art. Frequently in the older art, these charge-transfer compounds were referred to as Pi complexes. More recently, however, the concept has become well established that such complexes, or really compounds, are more properly described as charge-transfer compounds—see, for instance, Mulliken, J. Am. Chem. Soc. 74, 811 (1952).

The invention is generic to batteries based on organic and organo-inorganic Lewis acid/Lewis base charge-transfer compounds, including those which exhibit a detectable paramagnetic resonance. These charge-transfer compounds range in degree of charge transfer from those of true complex structure to those where actual and complete charge transfer exists in the ground electronic state of the compound. Those of this last mentioned type constitute the so-called ion radical salts, wherein at least one molecule of the Lewis acid component of the charge-transfer compound carries the transferred and accepted electron and accordingly a negative electronic charge and at least one molecule of the Lewis base component, having donated at least one electron to the Lewis acid component, will accordingly have an electron deficiency and, therefore, a positive electronic charge.

The invention is also generic to the use in batteries of charge-transfer compounds wherein the maximum charge transfer occurs not in the ground electronic state but rather in the excited state, as achieved, for instance, thermally or by input electrical energy—see Orgel, Quart. Rev. Chem. 8, 1422 (1954) for a discussion of this type of charge-transfer compound which in its ground state is diamagnetic.

Lewis acids and Lewis bases which form the charge-transfer compounds on which the batteries of the present invention are based are well known to the chemical arts—see G. N. Lewis, J. Franklin Inst. 226, 293 (1938). A Lewis acid is, by definition, a molecule, the structure or configuration of which, electronically speaking, is so arranged that the molecule is capable of accepting one or more electrons from a molecule which is capable of donating said electrons, i.e., has an electron-abundant structure. Many and varied electron acceptor compounds are known.

To list but a few well-recognized organo and organo-inorganic classes of Lewis acids, there can be named the polycyano- and polynitro-substituted ethylenes carrying also a plurality of halogen or nitroso substituents, e.g.,

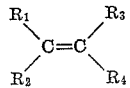

where $R_1=R_3$ and are pairwise CN or $NO_2$ and $$R_2=R_4=CN,$$

NO, or halogen;

the polycyano-, polyhalo-, or polynitro-substituted ortho-, i.e., 1,2-, aromatic quinones carrying, if desired, in addition to at least two cyano or two nitro ring substituents up to two hydrogens or nitroso substituents on ring carbon, e.g.,

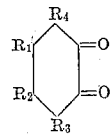

where $R_1=R_2=R_3=R_4=CN$ or halogen, when any two are CN then the other two can be halogen or hydrogen or NO, and when $R_3=R_4=NO_2$, then $R_1$ and/or $R_2$ can be hydrogen, halogen, CN, or NO;

the polycyano, polyhalo, polynitroso, and polynitro para-, i.e., 1,4-, aromatic quinones, e.g.,

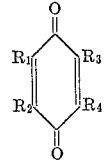

where $R_1=R_2=R_3=R_4=CN$ or halogen, when $$R_1=R_2=CN$$

then $R_3$ and/or $R$ can be hydrogen, halogen, or NO, when $R_1=R_3=CN$ or halogen then $R_2$ and $R_4$ can be NO or $NO_2$, and when $R_1=R_3=CN$ then $R_2$ and $R_4$ can be halogen or hydrogen;

the 1,4-bis(dicyanomethylene)-2,5-cyclohexadienes carrying, if desired, one or more halogen, cyano, nitroso, or nitro substituents on the 2, 3, 5, and/or 6 ring carbons, e.g.,

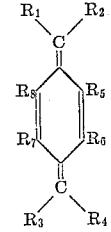

where $R_1=R_2=R_3=R_4=CN$ and $R_5$ through $R_8$=hydrogen, halogen, CN, or NO, when $R_5=R_7=NO_2$ then $R_6=R_8$=hydrogen, and when $R_5=R_8=NO_2$ then $R_6=R_7$=hydrogen;

the polycyano- and polynitro-substituted cyclobut-3-en-1,2-diones, e.g.,

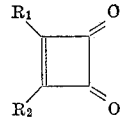

where $R_1=R_2=CN$ or $NO_2$;

the polycyano-, polyhalo-, or polynitro-substituted polycyclic aromatic quinones, e.g., the 2,3-dicyano-1,4-naphthoquinones, carrying four halogens or two or more cyano substituents on the benzo ring, the polycyano-and polyhalo-substituted 9,10-anthraquinones, e.g., 9,10-anthraquinones carrying four halogen substituents or two or more cyano substituents on each benzo ring, the hexacyano-3,8- or -3,10-pyrenequinones; the polycyano-, polyhalo-, and/or polynitro-substituted polycyclic aromatic polyquinones, e.g., the hexacyano-3,10,4,9-perylenediquinones, e.g., 1,2,5,7,8,11-hexacyano-3,10,4,9-perylenediquinone; polynitro- and polynitroso-substituted aromatic hydrocarbons, and the like.

In all the foregoing instances the halogen substituents there discussed are expressly inclusive of all the four normal halogens running from atomic weight 19 through 85, i.e., fluorine, chlorine, bromine, and iodine. Likewise, in all the foregoing instances the molecular structure can also carry functional substituents. Preferred are the electronegative substituents which can be classed as those which, when present on ring carbon of an aromatic nucleus, tend to direct any entering substituent radical into the meta-position with respect to the said functional substituent, i.e., the so-called meta-orienting groups. These substituents also have been described by Price, Chem. Rev. 29, 58 (1941), in terms of the electrostatic polarizing force as measured in dynes of the said substituent groups on an adjacent double bond of the benzene nucleus. Quantitatively, any substituent exhibiting a polarizing force in dynes greater than 0.50 can be regarded as electronegative and meta-orienting and is preferred as a functional substituent on the Lewis acids here involved. These preferred substituents include sulfo, chloroformyl, trifluoromethyl, methylsulfonyl, carboxy, hydrocarbyloxycarbonyl, formyl, nitromethyl, and the like.

Suitable specific Lewis acids for making the Lewis acid/Lewis base charge transfer compounds in molar ratios from 2/1 to 1/2 include such polycyanoethylenes as tetracyanoethylene; polycyanopolynitroso-substituted ethylenes such as 1,2-dicyano-1,2-dinitrosoethylene, which actually exists in the tautomeric ring form as dicyanofuroxan; polyhalo-substituted o-quinones such as fluoranil, i.e., tetrafluoro-o-quinone, chloranil, i.e., tetrachloro-o-quinone, bromanil, i.e., tetrabromo-o-quinone, iodanil, i.e., tetraiodo-o-quinone; polycyano-substituted quinones such as 2,3-dicyano-p-quinone; halocyano-substituted quinones such as 2-chloro-5,6-dicyano-1,4-benzoquinone; polyhalo-substituted polycyano-substituted quinones such as 2,3-dichloro-5,6-dicyano-1,4-benzoquinone; polycyano-substituted quinones such as 2,3,5,6-tetracyano-1,4-benzoquinone; 1,4-bis(dicyanomethylene)-2,5-cyclohexadienes and the polycyano-substituted derivatives thereof such as 7,7,8,8-tetracyanoquinodimethane and 2,3,5,6,7,7,8,8-octacyanoquinodimethane; polycyano-substituted cyclobutenones such as 2,3-dicyanocyclobuten-3-one; polyhalo-polynitroquinones such as 2,5-dichloro-3,6-dinitro-1,4-benzoquinone; and polynitro- and nitroso-substituted aromatic hydrocarbons, e.g., hexanitrosobenzene; and the like.

A Lewis base is, by definition, a molecule, the structure or configuration of which, electronically speaking, is so arranged that the molecule is capable of donating one or more electrons to a molecule which has an electron-deficient structure. Many and varied electron donor compounds are known. To list but a few well-recognized organo and organo-inorganic classes there can be named: the amines and various alkyl and aryl hydrocarbon-substituted amines which may be described structurally by the following two formula:

where $R_1$, $R_2$, $R_3$ are H, alkyl, or alkylene up to 10 carbons and when $R_1$ is aryl, $R_2$ and $R_3$ are H or alkyl up to 10 carbons,

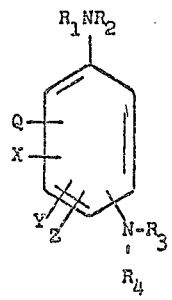

where the amino substituents are ortho or para to each other and $R_1$, $R_2$, $R_3$, $R_4$ are alkyl up to 10 carbons and Q, X, Y, Z are H or hydrocarbon up to 10 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q—X and/or Y—Z taken pairwise are cycloalkylene or fused aromatic, $R_1$ and $R_3$ are H; and the corresponding quaternary ammonium salts wherein the quaternary radical is another $R_1$, $R_2$, $R_3$, $R_4$ and any of the usual anions is involved.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammonium iodides, e.g., morpholine hydroiodide; all heterocycles containing nuclear nitrogen and the hydroiodides or alkyl iodide salts thereof;

substituted ethylenes of the type

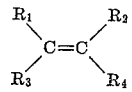

wherein from one to four of the $R_1$, $R_2$, $R_3$, or $R_4$ groups are amino or alkylamino, any remaining being alkyl, alkoxy, alkylthio, aryl, aryloxy, or arylthio; and the hydroiodide or alkyl iodide salts thereof, including the plain iodides, e.g. of the aminium type

and the Wurster iodides of aromatic amines, e.g., Wurster's blue iodide,

(In the foregoing diamines, it is expressly intended to include polynuclear diamines in which the nitrogens are connected by a conjugated system.);

the phosphines and alkyl or aryl hydrocarbon-substituted phosphines:

where $R_1$, $R_2$, and $R_3$ are alkyl or aryl up to 10 carbons (the aryls being unsubstituted or having o- and p-directing substituents),

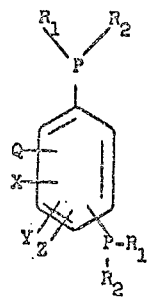

wherein $R_1$, $R_2$, Q, X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is involved;

the arsines and alkyl and aryl hydrocarbon-substituted arsines:

where $R_1$, $R_2$, and $R_3$ are as above in the phosphine analogs,

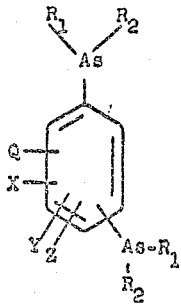

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions is involved;

the stibines and alkyl and aryl hydrocarbon-substituted stibines;

where $R_1$, $R_2$, and $R_3$ are as above in the arsine analogs,

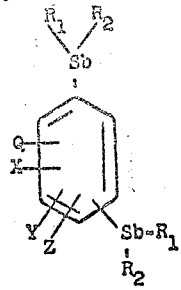

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved;

the quaternary ammonium bases or their salts, such as $R_1R_2R_3R_4N^{\oplus}$ where $R_1,R_2,R_3$, and $R_4$ are H or alkyl up to 10 carbons; metal cations describable by $M^{+x}$ where M is a metal and x is the formal cationic valence of the metal; metal chelates having all planar configurations, the atoms which coordinate with the metal being joined by a conjugated system of double bonds (aromatic or open chain); aromatic or heterocyclic aromatic aminophenols or ethers, the O and N atoms being connected by a conjugated system of double bonds; aromatic hydrocarbon or alkyl-substituted aromatic hydrocarbons including polynuclear ones; and polyhydric phenols and ethers thereof.

In all the foregoing instances, the molecular structure in the hydrocarbon moieties can also carry functional substituents. The preferred substituents can be classed as those which, when present on ring carbon of an aromatic nucleus, tend to direct any entering substituent radical into the ortho- or para-position, i.e., the so-called ortho-para orienting groups. These substituents have also been described by Price, Chem. Rev. 29, 58 (1941), in terms of the electrostatic polarizing force as measured in dynes of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 10 carbons; substituted alkyl up to 10 carbons, e.g., aminoalkyl, hydroxyalkyl, alkoxyalkyl, vinylalkyl, haloalkyl; hydroxy; alkoxy up to 10 carbons; thiol, alkyl thiol (up to 10 carbons); amino; N-alkylamino or N,N-dialkylamino with alkyls up to 10 carbons; N-monoarylamino; and the like.

Suitable specific Lewis bases for making the Lewis acid/Lewis base charge-transfer compounds in molar ratios from 2/1 to 1/2 acid/base include: ammonia and amines, such as ammonia, methylamine, dibutylamine, tridecylamine, and the like; diamines, such as 2,3-N,N,N',N'-hexamethyl-p-phenylenediamine, N,N'-dioctyl-1,5 - diaminonaphthalene, 1,4 - diamino - 5,6,7,8 - tetrahydronaphthalene, and the like; phosphines and diphosphines, such as triphenylphosphine, tributylphosphine, ethyldioctylphosphine, 1,4-bis(diethylphosphino)benzene, and the like; ammonium and quaternary ammonium bases and salts, such as ammonium iodide, ethyltrimethylammonium iodide, dioctylammonium iodide, methyltri-n-propylammonium iodide, tetramethylammonium hydroxide, and the like; metal carbonyls such as iron and cobalt carbonyls; metal chelates, such as copper salicylaldimine, cobalt pyrrolealdehydeimine, nickel 4-methoxysalicylaldoxime, copper 5-methoxy-8-quinolinolate, and the like; heterocyclic aromatic amines, phenols, and ethers, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; aromatic hydrocarbons and alkyl-substituted aromatic hydrocarbons, including polynuclear, such as chrysene, coronene, hexamethylbenzene, 2-ethylphenanthrene, and the like.

The charge-transfer compounds are simply prepared by contacting an organic or organo-inorganic Lewis acid and an organic or organo-inorganic Lewis base of the types named above, generally, but not necessarily, in an inert reaction medium.

The following examples are submitted to more fully illustrate but not to limit the Lewis acid/Lewis base charge-transfer compound batteries of the present invention:

Example I

In a cylindrical glass container was placed a porous alumina/silica cup to serve as a separator. Both compartments of the resultant cell were filled with a saturated solution of the 2/1 7,7,8,8-tetracyanoquinodimethane (TCNQ)/triethylammonium charge-transfer compound in acetonitrile (solids concentration about 0.3%). Platinum electrodes were supplied to each compartment for electron collection and distribution. An excess of triethylamine in acetonitrile was put in the inner compartment of the cell, and an excess of TCNQ in acetonitrile was placed in the outer compartment of the cell. Using a Simpson Model 260 volt ohmeter, a cell voltage of 0.11 volt was measured at room temperature. The cell delivered 60 microamperes into a 2500 ohm load, thereby demonstrating action as a primary battery. When the same cell was charged in both compartments only with the saturated acetonitrile solution of the 2/1 TCNQ/triethylammonium charge-transfer compound without excess TCNQ or excess triethylamine in either of the cell compartments, current could be drawn from the cell after charging with a conventional battery charger, thereby demonstrating the action of the cell as a secondary battery.

Example II

A platinum foil electrode, 1 cm. x 3 cm., was coated with a layer of a paste made up from graphite, acetonitrile, TCNQ, and the 2/1 TCNQ/triethylammonium charge-transfer compound. This paste layer was then topcoated with a piece of filter paper to serve as a separator and another paste layer placed on the topmost surface thereof, this second paste layer being prepared from carbon, acetonitrile, triethylamine, and the 2/1 TCNQ/triethylammonium charge-transfer compound and a second similar platinum foil electrode placed on the top most surface of said second paste layer. When the two platinum foil electrodes were connected by conducting means into an electric circuit and the open-circuit voltage therebetween determined, a reading of 0.4 volt at room temperature was obtained. The cell delivered 100 microamperes into a 2500 ohm load. The cell delivered one to two milliamperes into a 25 ohm load. The polarity indicated the following reactions:

$$e + TCNQ \rightarrow TCNQ^-$$

a reduction at the cathode (positive terminal), and $$R_3N \rightarrow R_3N^+ + e$$

an oxidation at the anode (negative terminal)

Since obvious modifications and equivalents in the invention will be evident to those skilled in the chemical arts, I propose to be bound solely by the appended claims.

The embodiments of the invention in which an exclusive property or privilege is claimed are defined as follows:

1. Nonaqueous batteries wherein (1) the cathode compartment contains an electrolyte having as an active ingredient a Lewis acid selected from the group consisting of polycyanoethylenes, polycyanopolynitroso-substituted ethylenes, polyhalo-substituted o-quinones, polycyano-substituted quinones, halocyano substituted quinones, polyhalo-substituted polycyano-substituted quinones, 1,4-bis(dicyanomethylene) - 2,5-cyclohexadienes and polycyano-substituted derivatives thereof, polycyano-substituted cyclobutenones, polyhalopolynitroquinones, and polynitro- and nitroso-substituted aromatic hydrocarbons and (2) the anode compartment contains an electrolyte having as an active ingredient a Lewis base selected from the group consisting of ammonia, amines, diamines, phosphines, diphosphines, arsines, stibines, ammonium and quaternary ammonium bases and salts, metal carboyls, metal chelates, heterocyclic aromatic amines, phenols and ethers, aromatic hydrocarbon ethers, and aromatic hydrocarbons and alkyl-substituted aromatic hydrocarbons.

2. A nonaqueous electrolytic cell having as an electrolyte a charge-transfer compound of (1) a Lewis acid selected from the group consisting of polycyanoethylenes, polycyanopolynitroso-substituted ethylenes, polyhalo-substituted o-quinones, polycyano-substituted quinones, halocyano-substituted quinones, polyhalo-substituted polycyano-substituted quinones, 1,4-bis(dicyanomethylene)-2,5-cyclohexadienes and polycyano-substituted derivatives thereof, polycyano-substituted cyclobutenones, polyhalopolynitroquinones, and polynitro- and nitro-substituted aromatic hydrocarbons and (2) a Lewis base selected from the group consisting of ammonia, amines, diamines, phosphines, diphosphines, arsines, stibines, ammonium and quaternary ammonium bases and salts, metal carbonyls, metal chelates, heterocyclic aromatic amines, phenols and ethers, aromatic hydrocarbon ethers, and aromatic hydrocarbons and alkyl-substituted aromatic hydrocarbons.

3. A nonaqueous electrolytic cell having an electrolyte wherein the active ingredient consists essentially of the 2/1 7,7,8,8-tetracyanoquinodimethane/triethylammonium charge-transfer compound.

4. The invention of claim 2 wherein the charge-transfer compound is in solution in an organic solvent.

5. The invention of claim 4 wherein the organic solvent is acetonitrile.

6. The invention of claim 2 wherein the charge-transfer compound is held within a paste.

References Cited in the file of this patent

Mulliken, Journal American Chemical Society, (vol. 74), p. 811 (1952).

Proceeding's of the Thirteenth Annual Power Sources Conference, Eisenberg), published by Power Sources Division, U.S. Army Signal Research and Development Laboratory, Fort Monmouth, New Jersey, April 30, 1959, pp. 114 to 119 relied on.